(12) United States Patent
Yamashita

(10) Patent No.: US 7,474,236 B2
(45) Date of Patent: Jan. 6, 2009

(54) METHOD OF AND APPARATUS FOR TRANSMITTING DIGITAL DATA

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 11/022,547

(22) Filed: Dec. 23, 2004

(65) Prior Publication Data

US 2005/0160341 A1    Jul. 21, 2005

(30) Foreign Application Priority Data

Dec. 26, 2003    (JP)    ............... P2003-432893

(51) Int. Cl.
*H03M 9/00*    (2006.01)
(52) U.S. Cl. .................... 341/101; 341/100
(58) Field of Classification Search .......... 341/95, 341/100, 101; 375/355, 362; 370/516, 503, 370/517
See application file for complete search history.

(56) References Cited

U.S. PATENT DOCUMENTS

| | | | | |
|---|---|---|---|---|
| 4,445,215 | A | * | 4/1984 | Svendsen ............. 370/517 |
| 4,698,809 | A | * | 10/1987 | Munter ............... 714/746 |
| 5,055,842 | A | * | 10/1991 | Mueller .............. 341/100 |
| 6,618,095 | B1 | * | 9/2003 | Takeuchi et al. ........ 348/476 |
| 7,088,398 | B1 | * | 8/2006 | Wolf et al. ........... 348/423.1 |
| 7,116,251 | B1 | * | 10/2006 | Groen et al. ........... 341/100 |

FOREIGN PATENT DOCUMENTS

| | | |
|---|---|---|
| JP | 10-41979 | 2/1998 |
| JP | 2000-101440 | 4/2000 |
| JP | 2002-320244 | 10/2002 |
| JP | 2003-304521 | 10/2003 |

* cited by examiner

*Primary Examiner*—Brian Young
(74) *Attorney, Agent, or Firm*—Frommer Lawrence & Haug LLP; William S. Frommer

(57) ABSTRACT

A method of transmitting digital data, with which parallel data, which are constituted with first, second and third data sequences each constituting 12-bit word sequence and multiplexed in parallel with one another to form a digital video signal, are first converted into first and second word sequence data, each of which are constituted with 10-bit words arranged in sequence. Each of the 10-bit words arranged in sequence to form each of the first and second word sequence data does not correspond to a predetermined forbidden code, and consequently, each of the first and second word sequence data do not contain specific 10 bits corresponding to the predetermined forbidden code and therefore can be easily and appropriately reconverted into the original parallel data forming the digital video signal. Then, the first and second word sequence data thus obtained are subjected to P/S conversion to be converted into the first and second serial data, respectively, and the first and second serial data are transmitted.

16 Claims, 8 Drawing Sheets

FIG. 4

| FORBIDDEN CODE | 10 BITS FOR REPLACING | | | | | | | | | |
|---|---|---|---|---|---|---|---|---|---|---|
| | (MSB) b9 | b8 | b7 | b6 | b5 | b4 | b3 | b2 | b1 | (LSB) b0 |
| 000h | 0 | 0 | 0 | 0 | 0 | 1 | 0 | 0 | 1/0 | 1/0 |
| 001h | 0 | 0 | 0 | 0 | 0 | 1 | 0 | 1 | 1/0 | 1/0 |
| 002h | 0 | 0 | 0 | 0 | 0 | 1 | 1 | 0 | 1/0 | 1/0 |
| 003h | 0 | 0 | 0 | 0 | 0 | 1 | 1 | 1 | 1/0 | 1/0 |
| 3FFh | 1 | 1 | 1 | 1 | 1 | 0 | 1 | 1 | 1/0 | 1/0 |
| 3FEh | 1 | 1 | 1 | 1 | 1 | 0 | 1 | 0 | 1/0 | 1/0 |
| 3FDh | 1 | 1 | 1 | 1 | 1 | 0 | 0 | 1 | 1/0 | 1/0 |
| 3FCh | 1 | 1 | 1 | 1 | 1 | 0 | 0 | 0 | 1/0 | 1/0 |

FIG. 5

10-BIT WORD GROUP 1

| 10 BITS | G0,11 ~ G0,2 | G1,11 ~ G1,2 | G2,11 ~ G2,2 | G3,11 ~ G3,2 | G4,11 ~ G4,2 | G5,11 ~ G5,2 | G6,11 ~ G6,2 | G7,11 ~ G7,2 |
|---|---|---|---|---|---|---|---|---|
| 10 BITS | B0,11 ~ B0,2 | B1,11 ~ B1,2 | B2,11 ~ B2,2 | B3,11 ~ B3,2 | B4,11 ~ B4,2 | B5,11 ~ B5,2 | B6,11 ~ B6,2 | B7,11 ~ B7,2 |
| 10 BITS | R0,11 ~ R0,2 | R1,11 ~ R1,2 | R2,11 ~ R2,2 | R3,11 ~ R3,2 | R4,11 ~ R4,2 | R5,11 ~ R5,2 | R6,11 ~ R6,2 | R7,11 ~ R7,2 |
| 10 BITS | GBR0 (0~1) + ID0~ID3 | GBR1 (0~1) + ID0~ID3 | GBR2 (0~1) + ID0~ID3 | GBR3 (0~1) + ID0~ID3 | GBR4 (0~1) + ID0~ID3 | GBR5 (0~1) + ID0~ID3 | GBR6 (0~1) + ID0~ID3 | GBR7 (0~1) + ID0~ID3 |

10-BIT WORD GROUP 2

FIG. 6

DPA (20) (74.25MB/s)
(LINK A)

A

| 10 BITS | G0 ;11 ~ G0 ;2 | G1 ;11 ~ G1 ;2 | G2 ;11 ~ G2 ;2 | G3 ;11 ~ G3 ;2 | G4 ;11 ~ G4 ;2 | G5 ;11 ~ G5 ;2 | G6 ;11 ~ G6 ;2 | G7 ;11 ~ G7 ;2 |
|---|---|---|---|---|---|---|---|---|
| 10 BITS | B0 ;11 ~ B0 ;2 | R0 ;11 ~ R0 ;2 | B2 ;11 ~ B2 ;2 | R2 ;11 ~ R2 ;2 | B4 ;11 ~ B4 ;2 | R4 ;11 ~ R4 ;2 | B6 ;11 ~ B6 ;2 | R6 ;11 ~ R6 ;2 |

DPA (20) (74.25MB/s)
(LINK B)

B (α-CHANNEL)

| 10 BITS | GBR0 (0~1) + ID0~ID3 | GBR1 (0~1) + ID0~ID3 | GBR2 (0~1) + ID0~ID3 | GBR3 (0~1) + ID0~ID3 | GBR4 (0~1) + ID0~ID3 | GBR5 (0~1) + ID0~ID3 | GBR6 (0~1) + ID0~ID3 | GBR7 (0~1) + ID0~ID3 |
|---|---|---|---|---|---|---|---|---|
| 10 BITS | B1 ;11 ~ B1 ;2 | R1 ;11 ~ R1 ;2 | B3 ;11 ~ B3 ;2 | R3 ;11 ~ R3 ;2 | B5 ;11 ~ B5 ;2 | R5 ;11 ~ R5 ;2 | B7 ;11 ~ B7 ;2 | R7 ;11 ~ R7 ;2 |

FIG. 7

| 10-BIT WORD IN α-CHANNEL | | | | | | | | | |
|---|---|---|---|---|---|---|---|---|---|
| (MSB) b9 | b8 | b7 | b6 | b5 | b4 | b3 | b2 | b1 | (LSB) b0 |
| Gn;1 | Gn;0 | Bn;1 | Bn;0 | Rn;1 | Rn;0 | ID3 | ID2 | ID1 | ID0 |

| D2 | D1 | D0 | WORD SEQUENCE TO WHICH SPECIFIC 10 BITS BELONG |
|---|---|---|---|
| 1 | 1 | 1 | EACH OF G, B AND R |
| 1 | 1 | 0 | EACH OF G AND B |
| 1 | 0 | 1 | EACH OF B AND R |
| 1 | 0 | 0 | EACH OF R AND G |
| 0 | 1 | 1 | G |
| 0 | 1 | 0 | B |
| 0 | 0 | 1 | R |
| 0 | 0 | 0 | NO FORBIDDEN CODE |

FIG. 9

| FORBIDDEN CODE | CONVERTED 10 BITS | | | | | | | | | |
|---|---|---|---|---|---|---|---|---|---|---|
| | (MSB) b9 (b11) | b8 (b10) | b7 (b9) | b6 (b8) | b5 (b7) | b4 (b6) | b3 (b5) | b2 (b4) | b1 (b3) | (LSB) b0 (b2) |
| 000h | 0 | 0 | 0 | 0 | 0 | 0 | 0 | 1 | 0 | 0 |
| 001h | 0 | 0 | 0 | 0 | 0 | 0 | 0 | 1 | 0 | 1 |
| 002h | 0 | 0 | 0 | 0 | 0 | 0 | 0 | 1 | 1 | 0 |
| 003h | 0 | 0 | 0 | 0 | 0 | 0 | 0 | 1 | 1 | 1 |
| 3FFh | 1 | 1 | 1 | 1 | 1 | 1 | 1 | 0 | 1 | 1 |
| 3FEh | 1 | 1 | 1 | 1 | 1 | 1 | 1 | 0 | 1 | 0 |
| 3FDh | 1 | 1 | 1 | 1 | 1 | 1 | 1 | 0 | 0 | 1 |
| 3FCh | 1 | 1 | 1 | 1 | 1 | 1 | 1 | 0 | 0 | 0 |

FIG. 10

10-BIT WORD GROUP 1

| | | | | | | | |
|---|---|---|---|---|---|---|---|
| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
| B0;11 ~ B0;2 | B1;11 ~ B1;2 | B2;11 ~ B2;2 | B3;11 ~ B3;2 | B4;11 ~ B4;2 | B5;11 ~ B5;2 | B6;11 ~ B6;2 | B7;11 ~ B7;2 |
| R0;11 ~ R0;2 | R1;11 ~ R1;2 | R2;11 ~ R2;2 | R3;11 ~ R3;2 | R4;11 ~ R4;2 | R5;11 ~ R5;2 | R6;11 ~ R6;2 | R7;11 ~ R7;2 |
| GBR0 (0~1) + α0 | GBR1 (0~1) + α1 | GBR2 (0~1) + α2 | GBR3 (0~1) + α3 | GBR4 (0~1) + α4 | GBR5 (0~1) + α5 | GBR6 (0~1) + α6 | GBR7 (0~1) + α7 |

Each row is 10 BITS.

10-BIT WORD GROUP 2

FIG. 11

A — DPA(20) (74.25MB/s) (LINK A)

| | | | | | | | |
|---|---|---|---|---|---|---|---|
| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
| B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

B (α-CHANNEL) — DPA(20) (74.25MB/s) (LINK B)

| | | | | | | | |
|---|---|---|---|---|---|---|---|
| GBR0 (0~1) + α0 | GBR1 (0~1) + α1 | GBR2 (0~1) + α2 | GBR3 (0~1) + α3 | GBR4 (0~1) + α4 | GBR5 (0~1) + α5 | GBR6 (0~1) + α6 | GBR7 (0~1) + α7 |
| B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 12

| (MSB) | 10-BIT WORD IN α-CHANNEL | | | | | | | | (LSB) |
|---|---|---|---|---|---|---|---|---|---|
| b9 | b8 | b7 | b6 | b5 | b4 | b3 | b2 | b1 | b0 |
| GnN;1 | Gn;1 | Gn;0 | Bn;1 | Bn;0 | Rn;1 | Rn;0 | ID2 | ID1 | ID0 |

GnN;1= INVERTED Gn;1
Gn = G0／G1／G2／・・・・・
Bn = B0／B1／B2／・・・・・
Rn = R0／R1／R2／・・・・・

FIG. 14

| (MSB) | 10-BIT WORD IN LINK A | | | | | | | | (LSB) |
|---|---|---|---|---|---|---|---|---|---|
| b9 | b8 | b7 | b6 | b5 | b4 | b3 | b2 | b1 | b0 |
| CnN;11 | Cn;11 | Cn;10 | Cn;9 | Cn;8 | Cn;7 | Cn;6 | Cn;5 | Cn;4 | Cn;3 |

CnN;11= INVERTED Cn;11
Cn= G0／G1／G2／・・・・・
   or B0／B1／B2／・・・・・
   or R0／R1／R2／・・・・・

FIG. 15

| (MSB) | 10-BIT WORD IN α-CHANNEL | | | | | | | | (LSB) |
|---|---|---|---|---|---|---|---|---|---|
| b9 | b8 | b7 | b6 | b5 | b4 | b3 | b2 | b1 | b0 |
| GnN;2 | Gn;2 | Gn;1 | Gn;0 | Bn;2 | Bn;1 | Bn;0 | Rn;2 | Rn;1 | Rn;0 |

GnN;2= INVERTED Gn;2
Gn = G0／G1／G2／・・・・・
Bn = B0／B1／B2／・・・・・
Rn = R0／R1／R2／・・・・・

METHOD OF AND APPARATUS FOR TRANSMITTING DIGITAL DATA

BACKGROUND OF THE INVENTION

1. Field of the Invention

The present invention generally relates to a method of and apparatus for transmitting digital data, and more particularly, is directed to improvements in a digital data transmitting method by which 12-bit word sequence data constituting a digital video signal which represents video signal information are converted into serial data to be transmitted, and in a digital data transmitting apparatus used for putting the above-mentioned method into practice.

2. Description of the Prior Art

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of word sequence data representing video signal information.

The digital video signal under the HDTV system (hereinafter, referred to an HD signal) is formed into word sequence data in accordance with a standardized data formats in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD signal produced in the form of Y and $P_B/P_R$ signals (hereinafter, referred to an HD signal of the Y and $P_B/P_R$ type) contains a Y data sequence and a $P_B/P_R$ data sequence, each of which forms, for example, 10-bit word sequence data composed of a sequence of 10-bit words, and which are combined in parallel with each other in frame be synchronized at every line period and every frame and line synchronism so as to form 20-bit word sequence data composed of a sequence of 10-bit word×2=20-bit words. Further, the HD signal produced in the form of G, B and R signals (hereinafter, referred to an HD signal of the G, B and R type) contains a G data sequence, a B data sequence and an R data sequence, each of which forms, for example, 10-bit word sequence data composed of a sequence of 10-bit words, and which are combined in parallel with one another in frame and line synchronism so as to form 30-bit word sequence data composed of a sequence of 10-bit word×3=30-bit words.

Although, under the current HDTV system, the HD signal of the Y and $P_B/P_R$ type or the G, B and R type for interlaced scanning by which each frame picture is reproduced at a rate of 30 Hz or 30/1.001 Hz (hereinafter, the expression:30 Hz includes both of 30 Hz and 30/1.001 Hz) with first and second field pictures, is used for reproducing color pictures, there has been proposed, as an HDTV system for the next generation, another HDTV system in which an HD signal of the Y and $P_B/P_R$ type or the G, B and R type for sequential scanning by which each frame picture is reproduced at a rate of 60 Hz or 60/1.001 Hz (hereinafter, the expression:60 Hz includes both of 60 Hz and 60/1.001 Hz) or 50 Hz without first and second field pictures. That is, the HD signal of the Y and $P_B/P_R$ type or the G, B and R type for interlaced scanning has a frame rate of 60 Hz or 50 Hz. This HD signal of the Y and $P_B/P_R$ type or the G, B and R type for sequential scanning which has the frame rate of 60 Hz or 50 Hz is usually called a progressive HD signal.

Digital data constituting the progressive HD signal having the frame rate of 60 Hz or 50 Hz have been standardized in data formats in accordance with SMPTE 274M which is one of a series of standards established by the Society of Motion Picture and Television Engineers (SMPTE) in the United States. In the data formats standardized in accordance with SMPTE 274M, 1920 active data samples per line, 1080 active lines per frame, the sampling frequency of 148.5 MHz or 148.5/1.001 MHz (hereinafter, the expression:148.5 MHz includes both of 148.5 MHz and 148.5/1.001 MHz), 8 or 10 bits for one word and so on are predetermined in addition to the frame rate of 60 Hz or 50 Hz. Then, parallel data interface is selected to be 8 bits×2=16 bits or 10 bits×2=20 bits for data of the Y and $P_B/P_R$ type and 8 bits×3=24 bits or 10 bits×3=30 bits for data of the G, B and R type.

For such 8-bit or 10-bit digital data constituting the digital video signal as mentioned above, some forbidden codes which can not be used for representing any video signal information are predetermined. For example, the forbidden codes for 8-bit digital data are 00h and FFh (00 and FF are hexadecimal numbers and h indicates a hexadecimal number), that is, "0000 0000" and "1111 1111", and the forbidden codes for 10-bit digital data are 000h~003h and 3FCh~3FFh (000, 003, 3FC and 3FF are hexadecimal numbers and h indicates a hexadecimal number), that is, "00 0000 0000"~"00 0000 0011" and "11 1111 1100"~"11 1111 1111". Some of these forbidden codes, for example, 000h and 3FFh are used for constituting a pair of time reference code data SAV (Start of Active Video) and EAV (End of Active Video) provided just before and after a portion of the digital video signal corresponding to each video data period.

Generally, in the case of the digital video signal of the Y and $P_B/P_R$ type, the sampling frequency of each of the $P_B$ data sequence and $P_R$ data sequence is selected to be a half of the sampling frequency of the Y data sequence. Hereinafter, as occasion demands, the digital video signal of the Y and $P_B/P_R$ type will be indicated as a digital video signal of the 4:2:2 type. On the other hands, in the case of the digital video signal of the G, B and R type, the respective sampling frequencies of the G, B and R data sequences are the same as one another. Hereinafter, as occasion demands, the digital video signal of the G, B and R type will be indicated as a digital video signal of the 4:4:4 type.

Apart from the HD signal as described above, there has been also proposed a kind of progressive HD signal which is aimed for reproducing moving pictures of a cinefilm at twenty-four frames per second with so improved quality as to be substantially equal to that of images reproduced by means of the HDTV system and so-called a D-Cinema signal.

Although the D-Cinema signal is able to be obtained in the form of one of the progressive HD, the frame rate of which is selected to be, for example, 24 Hz or 24/1.001 Hz (hereinafter, the expression:24 Hz includes both of 24 Hz and 24/1.001 Hz) as mentioned above, the frame rate of the D-Cinema signal is selected to be not only 24 Hz but also a rate other than 24 Hz, for example, 25 Hz or 30 Hz. Then, the D-Cinema signal is also formed into word sequence data in the form of Y and $P_B/P_R$ signals or G, B and R signals.

The D-Cinema signal produced in the form of Y and $P_B/P_R$ signals (hereinafter, referred to a D-Cinema signal of the Y and $P_B/P_R$ type) contains a Y data sequence and a $P_B/P_R$ data sequence, each of which forms, for example, 10-bit word sequence data composed of a sequence of 10-bit words, and which are combined in parallel with each other in frame and line synchronism so as to form 20-bit word sequence data composed of a sequence of 10-bit×2=20-bit words. Further, the D-Cinema signal produced in the form of G, B and R signals (hereinafter, referred to a D-Cinema signal of the G, B and R type) contains a G data sequence, a B data sequence and an R data sequence, each of which forms, for example, 10-bit word sequence data composed of a sequence of 10-bit words, and which are combined in parallel with one another in frame and line synchronism so as to form 30-bit word sequence data composed of a sequence of 10-bit×3=30-bit words.

Differing from the HD signal, any forbidden code which can not be used for representing video signal information is not predetermined for the D-Cinema signal. This means that, in the case of the D-Cinema signal, for example, the 10-bit digital data 000h~003h and 3FCh~3FFh which are the forbidden codes for the HD signal can be used for representing video signal information.

Digital data constituting the digital video signal having the frame rate of 24 Hz, 25 Hz or 30 Hz have been standardized also in data formats in accordance with SMPTE 274M. In such data formats standardized in accordance with SMPTE 274M, 1920 active data samples per line, 1080 active lines per frame, the sampling frequency of 74.25 MHz or 74.25/1.001 MHz (hereinafter, the expression:74.25 MHz includes both of 74.25 MHz and 74.25/1.001 MHz), 8 or 10 bits for one word and so on are predetermined in addition to the frame rate of 24 Hz, 25 Hz or 30 Hz. Then, parallel data interface is selected to be 8 bits×2=16 bits or 10 bits×2=20 bits for data of the 4:2:2 type and 8 bits×3=24 bits or 10 bits×3=30 bits for data of the 4:4:4 type.

Under such a condition, it has come to be desired to produce the digital date constituting the HD signal or the D-Cinema signal with a sequence of words each made of more than 10 bits, for example, 12 bits, that is, a 12-bit word sequence.

In general, when the HD signal or the D-Cinema signal formed with, for example, 10-bit or 12-bit word sequences are transmitted through a data transmission path constituted with, for example, a single or a plurality of coaxial cables or optical fibers, it is desired that the word sequence data (parallel data) constituting the HD signal or the D-Cinema signal are converted into bit sequence data (serial data) to be subjected to serial transmission because the data transmission path can be simplified in structure. It has been standardized by the SMPTE that the HD signal of the 4:2:2 type formed with 10-bit word sequences is to be subjected to serial transmission in accordance with HD SDI (High Definition Serial Digital Interface) provided by SMPTE 292M which is one of the standards established by the SMPTE. Further, It has been also standardized by the SMPTE that the HD signal formed with 12-bit word sequences is to be subjected to serial transmission in accordance with Dual Link 292M Interface provided by SMPTE 372M which is one of the standards established by the SMPTE.

In the serial transmission in accordance with HD SDI provided by SMPTE 292M, the HD signal of the 4:2:2 type formed with 10-bit word sequences so as to contain the time reference code data SAV and EAV constituted with the forbidden codes is converted into digital bit sequence data having a data rate (bit rate) of, for example, 1.485/1.000 Gb/s or 1.485/1.001 Gb/s and then transmitted through a data transmission path. In the serial transmission in accordance with Dual Link 292M Interface provided by SMPTE 372M, the HD signal formed with 12-bit word sequences so as to contain the time reference code data SAV and EAV constituted with the forbidden codes is converted into bit sequences data of two channels each having a data rate (bit rate) of, for example, 1.485/1.000 Gb/s or 1.485/1.001 Gb/s or a multiplexed bit sequence data having a data rate (bit rate) of, for example, 2.970/1.000 Gb/s or 2.970/1.001 Gb/s, which is constituted with the bit sequence data of two channels each having the data rate (bit rate) of, for example, 1.485/1.000 Gb/s or 1.485/1.001 Gb/s multiplexed with each other, and then transmitted through a data transmission path.

Although the serial transmission of the HD signal of the 4:2:2 type formed with 10-bit word sequences or the HD signal formed with 12-bit word sequences has been standardized in accordance with SMPTE 292M or SMPTE 372M established by the SMPTE as mentioned above, the serial transmission of the D-Cinema signal for which any forbidden code is not predetermined has not been subjected yet to the standardization by the SMPTE.

Then, it is likely to propose to cause, for example, a D-Cinema signal of the 4:4:4 type formed with 12-bit word sequences to be subjected to serial transmission in accordance with Dual Link 292M Interface provided by SMPTE 372M in the same manner as the serial transmission of the HD signal formed with 12-bit word sequences. In such a case, the D-Cinema signal of the 4:4:4 type formed with 12-bit word sequences may be converted into, for example, bit sequence data of two channels each having a data rate (bit rate) of 1.485/1.000 Gb/s or 1.485/1.001 Gb/s and then transmitted through a data transmission path. If this proposal is possible, the serial transmission of the D-Cinema signal of the 4:4:4 type formed with 12-bit word sequences can be realized with use of circuit elements having been developed for the serial transmission in accordance with Dual Link 292M Interface provided by SMPTE 372M.

However, the serial transmission in accordance with Dual Link 292M Interface provided by SMPTE 372M has been provided for the HD signal in which each portion corresponding to a video data period does not contain any forbidden code. Therefore, if the serial transmission in accordance with Dual Link 292M Interface provided by SMPTE 372M is applied to the D-Cinema signal in which some forbidden codes may appear in a portion corresponding to each video data period, such a trouble in data transmission that the original D-Cinema signal can not be appropriately reproduced from the transmitted digital data based on the D-Cinema signal in a data receiving side where the transmitted digital data are received is likely to occur when the forbidden code appears actually in the portion of the D-Cinema signal corresponding to the video data period.

Under such a situation, it is desired that a data transmitting system by which the serial transmission-of the D-Cinema signal of the 4:4:4 type formed with, for example, 12-bit word sequences is realized without troubles resulting from the fact that any forbidden code is not predetermined for the D-Cinema signal so as not to eliminate the forbidden code from a portion of the D-Cinema signal corresponding to each video data period. However, for the present, any practical embodiment of data transmitting system which can realize appropriately the above-mentioned serial transmission of the D-Cinema signal has not been previously found. Further, any literature, paper or thesis disclosing practical technology related to the data transmitting system which can realize appropriately the above-mentioned serial transmission of the D-Cinema signal has not been previously found also.

Objects and Summary of the Invention

Accordingly, it is an object of the present invention to provide a method of transmitting digital data, by which parallel data constituting a digital video signal such as a D-Cinema signal are converted into serial data to be subjected to such serial transmission that the original parallel data can be appropriately reproduced from transmitted serial data in a data receiving side in which the transmitted serial data are received.

Another object of the present invention is to provide a method of transmitting digital data, by which parallel data which are constituted with, for example, three data sequences each constituting 12-bit word sequence and multiplexed in parallel with one another to form a digital video signal, such as a D-Cinema signal of the 4:4:4 type formed with 12-bit word sequences, are converted into serial data of two channels to be transmitted through, for example, a single transmission path in the form of, for example, a multiplexed light signal constituted with dual light signals which are produced based on the serial data of two channels, respectively, to have different respective wavelengths and multiplexed in wavelength with each other, so that the original parallel data can be appropriately reproduced from transmitted serial data of two channels in a data receiving side in which the transmitted serial data of two channels are received.

A further object of the present invention to provide an apparatus for transmitting digital data, by which parallel data constituting a digital video signal such as a D-Cinema signal are converted into serial data to be subjected to such serial transmission that the original parallel data can be appropriately reproduced from transmitted serial data in a data receiving side in which the transmitted serial data are received.

A still further object of the present invention is to provide an apparatus for transmitting digital data, by which parallel data which are constituted with, for example, three data sequences each constituting 12-bit word sequence and multiplexed in parallel with one another to form a digital video signal, such as a D-Cinema signal of the 4:4:4 type formed with 12-bit word sequences, are converted into serial data of two channels to be transmitted through, for example, a single transmission path in the form of, for example, a multiplexed light signal constituted with dual light signals which are produced based on the serial data of two channels, respectively, to have different respective wavelengths and multiplexed in wavelength with each other, so that the original parallel data can be appropriately reproduced from transmitted dual channels of in a data receiving side in which the transmitted serial data of two channels are received.

According to a first aspect of the present invention, there is provided a method of transmitting digital data, which comprises the steps of forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, obtaining identification data representing one of the first, second and third data sequences, to which one of the 12-bit words containing specific 10 bits corresponding to a predetermined forbidden code belongs, when one of divided upper 10-bit portions contains the specific 10 bits, replacing the specific 10 bits with additional 10 bits which do not correspond to the predetermined forbidden code when the identification data are obtained, replacing also 2 bits contained in one of divided lower 2-bit portions obtained from the 12-bit word which had contained the specific 10 bits with predetermined 2 bits which are prepared for replacing when the identification data are obtained, arranging in sequence 10-bit words each constituted with the divided upper 10-bit portion and at least one 10-bit word constituted with the additional 10 bits to produce the first word sequence data when the identification data are obtained, and arranging in sequence 10-bit words each constituted with 10 bits which include the divided lower 2-bit portions and the identification data and at least one 10-bit word constituted with 10 bits which include at least one group of the predetermined 2 bits and the identification data to produce the second word sequence data when the identification data are obtained; converting the first word sequence date into first serial data and the second word sequence data to second serial data; and transmitting the first and second serial data.

In one embodiment of the first aspect of the present invention, the additional 10 bits used for replacing the specific 10 bits are produced based on a lower 10-bit portion of the 12-bit word which had contained the specific 10 bits by means of inverting at least one of 10 bits contained in the lower 10-bit.

According to a second aspect of the present invention, there is provided a method of transmitting digital data, which comprises the steps of forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, obtaining identification data representing one of the first, second and third data sequences, to which one of the 12-bit words containing specific 10 bits corresponding to a predetermined forbidden code belongs, when one of the divided upper 10-bit portions contains the specific 10 bits, converting the specific 10 bits into additional 10 bits which do not correspond to the predetermined forbidden code by means of inverting one or more bits contained in the specific 10 bits when the identification data are obtained, arranging in sequence 10-bit words each constituted with the divided upper 10-bit portion and at least one 10-bit word constituted with the additional 10 bits to produce the first word sequence data when the identification data are obtained, and arranging in sequence 10-bit words each constituted with 10 bits which include divided lower 2-bit portions, an inverted bit obtained by inverting one of 2 bits contained in one of the divided lower 2-bit portion and the identification data to produce the second word sequence data when the identification data are obtained; converting the first word sequence date into first serial data and the second word sequence data to second serial data; and transmitting the first and second serial data.

According to a third aspect of the present invention, there is provided a method of transmitting digital data, which comprises the steps of forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 9-bit portion and a lower 3-bit portion, producing 10-bit words each constituted with one of divided upper 9-bit portions and a first inverted bit obtained by means of inverting one of 9 bits contained in the divided upper 9-bit portion, arranging in sequence the 10-bit words to produce the first word sequence data, and arranging in sequence additional 10-bit words each constituted with 10 bits including the divided lower 3-bit portion and a second inverted bit obtained by means of inverting one of 3 bits contained in the divided lower 3-bit portion to produce the second word sequence data; converting the first word sequence date into first serial data and the second word sequence data to second serial data; and transmitting the first and second serial data.

According to a fourth aspect of the present invention, there is provided an apparatus for transmitting digital data, which comprises data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, forbidden code detecting means for detecting specific 10 bits corresponding to a predetermined forbidden code contained in one of divided upper 10-bit portions, and identification data producing means for obtaining identification data representing one of the first, second and third data sequences, to which one of the 12-bit words containing the specific 10 bits detected by the forbidden code detecting means belongs, wherein the specific 10 bits are replaced with additional 10 bits which do not correspond to the predetermined forbidden code and 2 bits contained in one of divided lower 2-bit portions obtained from the 12-bit word which had contained the specific 10 bits are also replaced with predetermined 2 bits which are prepared for replacing when the specific 10 bits are detected by the forbidden code detecting means, 10-bit words each constituted with the divided upper 10-bit portion and at least one 10-bit word constituted with the additional 10 bits are arranged in sequence to produce first word sequence data when the specific 10 bits are detected by the forbidden code detecting means, and 10-bit words each constituted with 10 bits which include the divided lower 2-bit portions and the identification data and at least one 10-bit word constituted with 10 bits which include at least one group of the predetermined 2 bits and the identification data are arranged in sequence to produce second word sequence data when the specific 10 bits are detected by the forbidden code detecting means; parallel to serial (hereinafter, referred to as P/S) converting means for converting the first word sequence date obtained from the data processing means into first serial data and the second word sequence data obtained from the data processing means into second serial data; and data transmitting means for transmitting the first and second serial data obtained from the P/S converting means.

In one embodiment of the fourth aspect of the present invention, the aforementioned data processing means, P/S converting means and data transmitting means are provided and the additional 10 bits used for replacing the specific 10 bits in the data processing means are produced based on a lower 10-bit portion of the 12-bit word which had contained the specific 10 bits by means of inverting one or more of 10 bits contained in lower 10-bit portion of the 12-bit word which had contained the specific 10 bits.

According to a fifth aspect of the present invention, there is provided an apparatus for transmitting digital data, which comprises data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, forbidden code detecting means for detecting specific 10 bits corresponding to a predetermined forbidden code contained in one of divided upper 10-bit portions, and identification data producing means for obtaining identification data representing one of the first, second and third data sequences, to which one of the 12-bit words containing the specific 10 bits detected by the forbidden code detecting means belongs, wherein the specific 10 bits are converted into additional 10 bits which do not correspond to the predetermined forbidden code by means of inverting one or more bits contained in the specific 10 bits when the specific 10 bits are detected by the forbidden code detecting means, 10-bit words each constituted with the divided upper 10-bit portion and at least one 10-bit word constituted with the additional 10 bits are arranged in sequence to produce first word sequence data when the specific 10 bits are detected by the forbidden code detecting means, and 10-bit words each constituted with 10 bits which include divided lower 2-bit portions, an inverted bit obtained by means of inverting one of 2 bits contained in one of the divided lower 2-bit portions and the identification data are arranged in sequence to produce second word sequence data when the specific 10 bits are detected by the forbidden code detecting means; P/S converting means for converting the first word sequence date obtained from the data processing means into first serial data and the second word sequence data obtained from the data processing means into second serial data; and data transmitting means for transmitting the first and second serial data obtained from the P/S converting means.

According to a sixth aspect of the present invention, there is provided an apparatus for transmitting digital data, which comprises data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 9-bit portion and a lower 3-bit portion, wherein 10-bit words each constituted with one of divided upper 9-bit portions and a first inverted bit obtained by means of inverting one of 9 bits contained in the divided upper 9-bit portion are produced, the 10-bit words thus produced are arranged in sequence to produce first word sequence data, and additional 10-bit words each constituted with 10 bits which include divided lower 3-bit portions and a second inverted bit obtained by means of inverting one of 3 bits contained in the divided lower 3-bit portion are arranged in sequence to produce second word sequence data; P/S converting means for converting the first word sequence date obtained from the data processing means into first serial data and the second word sequence data obtained from the data processing means into second serial data; and data transmitting means for transmitting the first and second serial data obtained from the P/S converting means.

With the method of or apparatus for transmitting digital data thus constituted in accordance with one of the first to sixth aspects of the present invention, the parallel data which are constituted with the first, second and third data sequences each constituting the 12-bit word sequence and multiplexed in parallel with one another to form the digital video signal are first converted into the first and second word sequence data, each of which are constituted with the 10-bit words arranged in sequence. Each of the 10-bit words arranged in sequence to form each of the first and second word sequence data does not correspond to the predetermined forbidden code. Consequently, each of the first and second word sequence data do not contain the specific 10 bits corresponding to the forbidden code and therefore can be easily and appropriately reconverted into the original parallel data forming the digital video signal.

Then, the first and second word sequence data obtained as mentioned above are subjected to P/S conversion to be converted into the first and second serial data, respectively, and the first and second serial data are transmitted.

Accordingly, with the method of or apparatus for transmitting digital data thus constituted in accordance with one of the first to sixth aspects of the present invention, parallel data which are constituted with three data sequences each constituting 12-bit word sequence and multiplexed in parallel with one another to form a digital video signal, such as the D-Cinema signal of the 4:4:4 type formed with 12-bit word sequences, can be converted into word sequence data of two channels, each of which do not contain the specific 10 bits corresponding to the forbidden code and therefore can be easily and appropriately reconverted into the original parallel data forming the digital video signal, and thus obtained word sequence data of two channels are converted into serial data of two channels, respectively, to be transmitted. When the serial data of two channels are transmitted, it is possible to multiplex the serial data of two channels with each other to produce a multiplexed serial data of a single channel and then transmit the multiplexed serial data.

Consequently, the serial transmission of the D-Cinema signal of the 4:4:4 type formed with, for example, 12-bit word sequences can be realized without troubles resulting from the fact that any forbidden code is not predetermined for the D-Cinema signal so as not to eliminate the forbidden code from a portion of the D-Cinema signal corresponding to each video data period.

The above and other objects, features and advantages of the present invention will become apparent from the following detailed description which is to be read in conjunction with the accompanying drawings.

BRIEF DESCRIPTION OF THE DRAWINGS

FIGS. 4 to 7 are data charts used for explaining the operation of the data processing portion provided in the data transmitting and receiving apparatus shown in FIG. 1;

FIG. 8 is a data chart used for explaining another example of identification data produced in the data processing portion provided in the data transmitting and receiving apparatus shown in FIG. 1;

FIGS. 9 to 12 are data charts used for explaining the operation of the data processing portion provided in the data transmitting and receiving apparatus shown in FIG. 1;

FIGS. 14 and 15 are data charts used for explaining the operation of a data processing portion provided in the data transmitting and receiving apparatus shown in FIG. 13.

DESCRIPTION OF THE PREFERRED EMBODIMENTS

Figure 1:
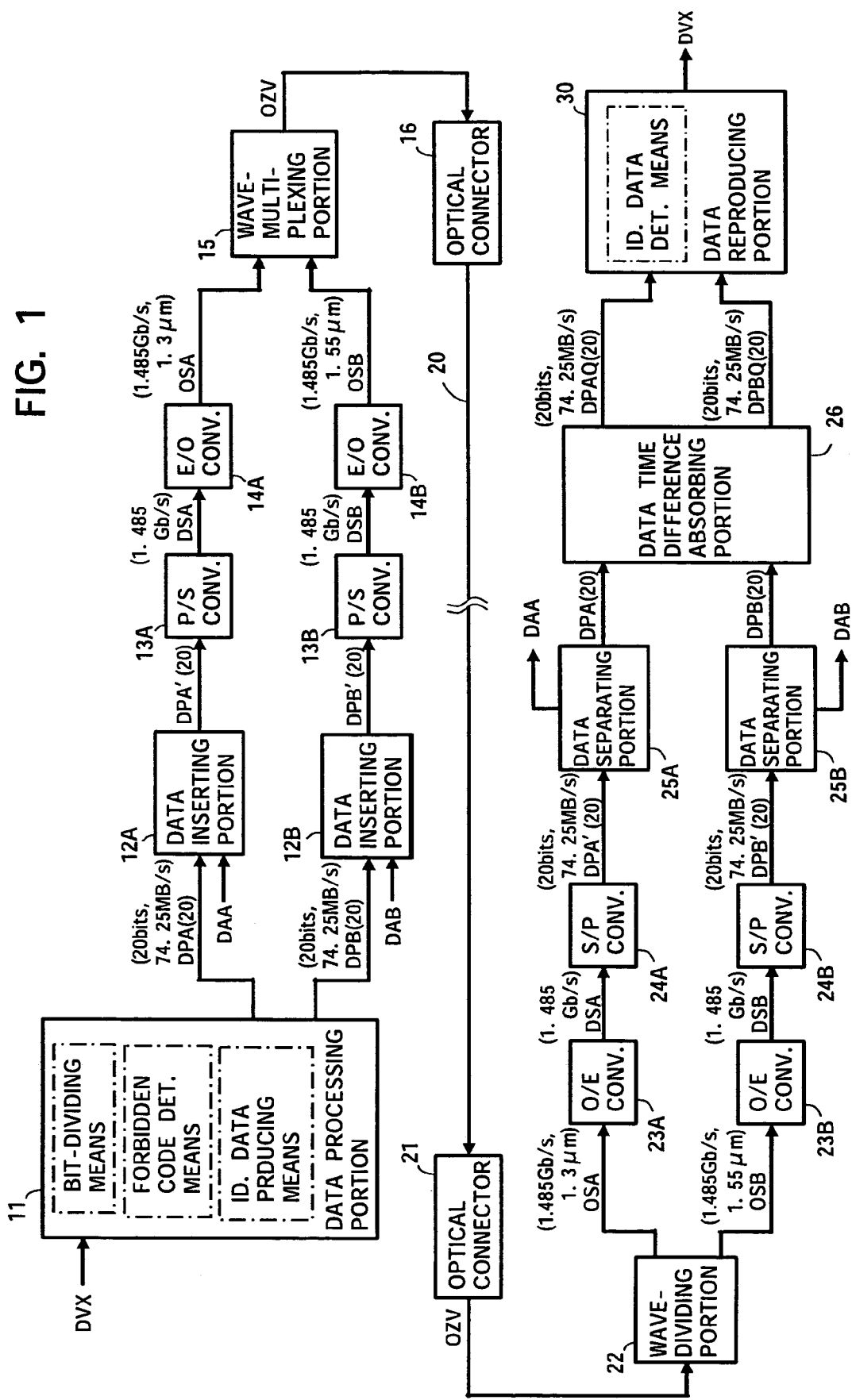
FIG. 1 is a schematic block diagram showing an example of a data transmitting and receiving apparatus including a first embodiment of apparatus for transmitting digital data according to the fourth of fifth aspects of the present invention, in which a first embodiment of method of transmitting digital data according to the first or second aspect of the present invention is carried out.

FIG. 1 shows an example of a data transmitting and receiving apparatus including a first embodiment of apparatus for transmitting digital data according to the fourth or fifth aspect of the present invention, in which a first embodiment of method of transmitting digital data according to the first or second aspect of the present invention is carried out.

Referring to FIG. 1, in a transmitting side which constitutes the first embodiment of apparatus for transmitting digital data according to the fourth or fifth aspect of the present invention, parallel data DVX constituting a digital video signal are supplied to a data processing portion 11.

The digital video signal constituted with the parallel data DVX is, for example, a D-Cinema signal of the 4:4:4 type formed with 12-bit word sequences. The D-Cinema signal of the 4:4:4 type formed with 12-bit word sequences has a frame rate of, for example, 24 Hz, 1125 lines per frame, 1080 active lines per frame, a sampling frequency of 74.25 MHz and 1920 active data samplings and less per line.

Figures 2, 3:
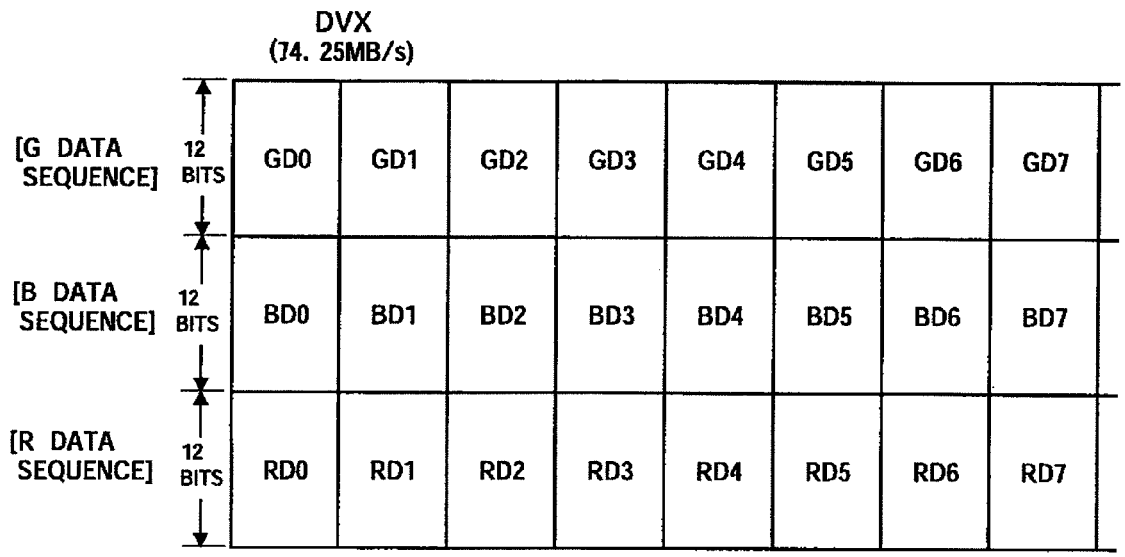
FIG. 2 is a data chart used for explaining the operation of a data processing portion provided in the data transmitting and receiving apparatus shown in FIG. 1.
FIG. 3 is a data chart used for explaining an example of identification data produced in the data processing portion provided in the data transmitting and receiving apparatus shown in FIG. 1.

The parallel data DVX constituting the D-Cinema signal of the 4;4;4 type formed with 12-bit word sequences are supplied to the data processing portion 11 in the form of 36-bit word sequence data having a data rate (word rate) of 74.25 MB/s, in which a G data sequence of 12-bit word sequence data having a data rate (word rate) of 74.25 MB/s, a B data sequence of 12-bit word sequence data having a data rate (word rate) of 74.25 MB/s and an R data sequence of 12-bit word sequence data having a data rate (word rate) of 74.25 MB/s are multiplexed in parallel with one another in frame and line synchronism, as shown in FIG. 2.

The data processing portion 11 is operative to subject the parallel data DVX to a selected one of various different data processings.

In an example of the data processing selected for the parallel data DVX in the data processing portion 11, the parallel data DVX supplied in the form shown in FIG. 2 are subjected to bit-dividing by bit-dividing means provided in the data processing portion 11 in which each of 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence is divided into an upper. 10-bit portion (G0;2~G0;11, G1;2~G1;11, G2;2~G2;11, G3;2~G3;11, . . . B0;2~B0;11, B1;2~B1;11, B2;2~B2;11, B3;2~B3;11, . . . , R0;2~R0;11, R1;2~R1;11, R2;2~R2;11, R3;2~R3;11, . . . ) and a lower 2-bit portion (G0;0~G0;1, G1;0~G1;1, G2;0~G2;1, G3;0~G3;1, . . . , B0;0~B0;1, B1;0~B1;1, B2;0~B2;1, B3;0~B3;1, . . . , R0;0~R0;1, R1;0~R1;1, R2;0~R2;1, R3;0~R3;1, . . . ).

Each of the upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . obtained in the bit-dividing means may contain specific 10 bits corresponding to a predetermined forbidden code, such as one of 000h~003h and 3FCh~3FFh as aforementioned. Therefore, the upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . are subjected to detection of the specific 10 bits corresponding to the predetermined forbidden code by forbidden code detecting means provided in the data processing portion 11.

When the specific 10 bits corresponding to the predetermined forbidden code are not detected by the forbidden code detecting means, any further data processing is not conducted in this step. On the other hand, when the specific 10 bits corresponding to the predetermined forbidden code are detected by the forbidden code detecting means, identification data which represent one of the 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence, from which the specific 10 bits corresponding to the predetermined forbidden code are divided, are produced by identification data producing means provided in the data processing portion 11. This means that the identification data represent one of the G, B and R data sequences, to which the 12-bit word containing the specific 10 bits corresponding to the predetermined forbidden code detected by the forbidden code detecting means belongs.

The identification data obtained from the identification data producing means are constituted with, for example, 4 bits of ID0, ID1, ID2 and ID3. Such identification data indicate with "1 1 0 1" that the 12-bit word containing the specific 10 bits detected by the forbidden code detecting means belongs to each of the G, B and R data sequences, with "1 0 1 1" that the 12-bit word containing the specific 10 bits detected by the forbidden code detecting means belongs to each of the G and B data sequences, with "1 0 1 0" that the 12-bit word containing the specific 10 bits detected by the forbidden code detecting means belongs to each of the B and R data sequences, with "1 0 0 1" that the 12-bit word containing the specific 10 bits detected by the forbidden code detecting means belongs to each of the R and G data sequences, with "0 1 1 1" that the 12-bit word containing the specific 10 bits detected by the forbidden code detecting means belongs to the G data sequence, with "0 1 1 0" that the 12-bit word containing the specific 10 bits detected by the forbidden code detecting means belongs to the B data sequence, and with "0 1 0 1" that the 12-bit word containing the specific 10 bits detected by the forbidden code detecting means belongs to the R data sequence, as shown in FIG. 3.

Incidentally, when the specific 10 bits corresponding to the predetermined forbidden code are not detected by the forbidden code detecting means and the 12-bit word containing the specific 10 bits detected by the forbidden code detecting means does not belong to any of the G, B and R data sequences, 4 bits of ID0, ID1, ID2 and ID3 constituting the identification data are put in combinations of "1" and "0" other than the combinations mentioned above.

Further, when the specific 10 bits corresponding to the predetermined forbidden code are detected by the forbidden code detecting means, a lower 10-bit portion of one of the 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence, which contains the specific 10 bits detected by the forbidden code detecting means, is subjected to bit-inversion in which one of 10 bits contained in the lower 10-bit portion, for example, the fifth bit counted from the least significant bit, is inverted to produce converted 10 bits which do not correspond to the specific 10 bits. The converted 10 bits thus obtained are used for bit-replacement in which the specific 10 bits detected by the forbidden code detecting means are replaced with the converted 10 bits used as 10 bits for replacing. When a plurality of 10-bit groups each containing the specific 10 bits are detected by the forbidden code detecting means, each of the 10-bit groups is replaced with corresponding 10 bits for replacing.

FIG. 4 shows a relation between the forbidden code to which the specific 10 bits correspond and the 10 bits for replacing. In FIG. 4, b0~b9 represent 10 bits from the least significant bit (LSB) b0 to the most significant bit (MSB) b9 constituting the 10 bits for replacing. The 10 bits from b0 to b9 constituting the 10 bits for replacing correspond to 10 bits obtained by inverting the fifth bit (b4) counted from the least significant bit of 10 bits contained in the lower 10-bit portion of one of the 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence. For example, FIG. 4 shows that the 10 bits for replacing are one of "0 0 0 0 0 1 0 0 0 0", "0 0 0 0 0 1 0 0 0 1", "0 0 0 0 0 1 0 0 1 0" and "0 0 0 0 0 1 0 0 1 1" when the forbidden code to which the specific 10 bits correspond are 000h. Other cases are similarly shown in FIG. 4. It is apparent that each of eight 10-bit groups of the 10 bits for replacing does not correspond to the forbidden code.

In addition to the above, when the specific 10 bits corresponding to the predetermined forbidden code are detected by the forbidden code detecting means, one of the lower 2-bit portions G0;0~G0;1, G1;0~G1;1, G2;0~G2;1, G3;0~G3;1, . . . , B0;0~B0;1, B1;0~B1;1, B2;0~B2;1, B3;0~B3;1, . . . and R0;0~R0;1, R1;0~R1;1, R2;0~R2;1, R3;0~R3;1, . . . divided from one of the 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence, which had contained the specific 10 bits corresponding to the predetermined forbidden code detected by the forbidden code detecting means, is subjected to bit-replacement in which 2 bits contained therein are replaced with predetermined 2 bits which are prepared for replacing. The predetermined 2 bits are selected to be, for example, "0 1" or "1 0".

The lower 2-bit portions G0;0~G0;1, G1;0~G1;1, G2;0~G2;1, G3;0~G3;1, . . . B0;0~B0;1, B1;0~B1;1, B2;0~B2;1, B3;0~B3;1, . . . and R0;0~R0;1, R1;0~R1;1, R2;0~R2;1, R3;0~R3;1, . . . , any of which has not been subjected to the bit replacement with the predetermined 2 bit or some of which have been subjected to the bit replacement with the predetermined 2 bit, are further subjected to bit-processing in which the lower 2-bit portions G0;0~G0;1, B0;0~B0;1 and R0;0~R0;1 are bit-multiplexed to produce 6-bit word GBR0(0~1), the lower 2-bit portions G1;0~G1;1, B1;0~B1;1 and R1;0~R1;1 are bit-multiplexed to produce 6-bit word GBR1(0~1), the lower 2-bit portions G2;0~G2;1, B2;0~B2;1 and R2;0~R2;1 are bit-multiplexed to produce 6-bit word GBR2(0~1), the lower 2-bit portions G3;0~G3;1, B3;0~B3;1 and R3;0~R3;1 are bit-multiplexed to produce 6-bit word GBR3(0~1), . . . .

Then, the 4 bits ID0, ID1, ID2 and ID3 constituting the identification data are added to each of the 6-bit words GBR0 (0~1), GBR1(0~1), GBR2(0~1), GBR3(0~1) . . . to produce 10-bit word GBR0(0~1)+ID0~ID3, GBR1(0~1)+ID0~ID3, GBR2(0~1)+ID0~ID3, GBR3(0~1)+ID0~ID3, . . . . Each of the 10-bit word GBR0(0~1)+ID0~ID3, GBR1(0~1)+ ID0~ID3, GBR2(0~1)+ID0~ID3, GBR3(0~1)+ID0~ID3, . . . thus produced does not correspond to the forbidden code even if it includes the predetermined 2 bits selected to be "0 1" or "1 0".

The upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . , any of which has not been subjected to the bit-replacement in which the specific 10 bits are replaced with the 10 bits for replacing or some of which have been subjected to the bit-replacement in which the specific 10 bits are replaced with the 10 bits for replacing, are put in group 1 and group 2 and the 10-bit word data GBR0(0~1)+ ID0~ID3, GBR1(0~1)+ID0~ID3, GBR2(0~1)+ID0~ID3, GBR3(0~1)+ID0~ID3, . . . are added to the group 2, so that 10-bit word group 1 and 10-bit word group 2 which are partitioned with bold lines on a table shown in FIG. 5 are obtained.

20-bit word sequence data DPA(20) having the word rate of 74.25 MB/s are formed based on the 10-bit word group 1 shown in FIG. 5 as a link A, as shown in FIG. 6A. Similarly, 20-bit word sequence data DPB(20) having the word rate of 74.25 MB/s are formed based on the 10-bit word group 2 shown in FIG. 5 as a link B, as shown in FIG. 6B.

Namely, the parallel data DVX in the form of 36-bit word sequence data having the word rate 74.25 MB/s are converted to a couple of 20-bit word sequence data which are the 20-bit word sequence data DPA(20) having the word rate of 74.25 MB/s and the 20-bit word sequence data DPB(20) having the word rate of 74.25 MB/s.

When 10-bit word sequence data which include 4 bits ID0~ID3 constituting the identification data in the 20-bit word sequence data DPB(20) is named α-channel as shown in FIG. 6B, each 10-bit word in the α-channel is shown in FIG. 7, for example. In FIG. 7, b0~b9 represent 10 bits from the least significant bit (LSB) b0 to the most significant bit (MSB) b9 constituting each 10-bit word in the α-channel. In each 10-bit word in the α-channel, lower 4 bits b0~b3 are composed of 4 bits ID0~ID3 constituting the identification data and upper 6 bits b4~b9 are composed of the lower 2-bit portions Rn;0, Rn;1, Bn;0, Bn;1, Gn;0 and Gn;1, any of which has not been subjected to the bit replacement with the predetermined 2 bit or some of which have been subjected to the bit replacement with the predetermined 2 bit.

In another example of the data processing selected for the parallel data DVX in the data processing portion 11, the parallel data DVX supplied in the form shown in FIG. 2 are subjected to bit-dividing by the bit-dividing means in which each of 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence is divided into an upper 10-bit portion (G0;2~G0;11, G0;2~G1;11, G2;2~G2;11, G3;2~G3;11, B0;2~B0;11, B1;2~B1;11, B2;2~B2;11, B3;2~B3;11, . . . , R0;2~R0;11, R1;2~R1;11, R2;2~R2;11, R3;2~R3;11, . . . ) and a lower 2-bit portion (G0;0~G0;1, G1;0~G1;1, G2;0~G2;1, G3;0~G3;1, . . . , B0;0~B0;1, B1;0~B1;1, B2;0~B2;1, B3;0~B3;1, . . . , R0;0~R0;1, R1;0~R1;1, R2;0~R2;1, R3;0~R3;1, . . . ).

Each of the upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . obtained in the bit-dividing means may contain the specific 10 bits corresponding to the predetermined forbidden code, such as one of 000h~003h and 3FCh~3FFh as aforementioned. Therefore, the upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . are subjected to detection of the specific 10 bits by the forbidden code detecting means.

When the specific 10 bits are not detected by the forbidden code detecting means, any further data processing is not conducted in this step. On the other hand, when the specific 10 bits are detected by the forbidden code detecting means, the identification data which represent one of the 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence, from which the specific 10 are divided, are produced by the identification data producing means. This means that the identification data represent one of the G, B and R data sequences, to which the 12-bit word containing the specific 10 bits detected by the forbidden code detecting means belongs.

The identification data obtained from the identification data producing means are constituted with, for example, 3 bits of ID0, ID1 and ID2. Such identification data indicate with "1 1 1" that the 12-bit word containing the specific 10 bits detected by the forbidden code detecting means belongs to each of the G, B and R data sequences, with "1 1 0" that the 12-bit word containing the specific 10 bits detected by the forbidden code detecting means belongs to each of the G and B data sequences, with "1 0 1" that the 12-bit word containing the specific 10 bits detected by the forbidden code detecting means belongs to each of the B and R data sequences, with "1 0 0" that the 12-bit word containing the specific 10 bits detected by the forbidden code detecting means belongs to each of the R and G data sequences, with "0 1 1" that the 12-bit word containing the specific 10 bits detected by the forbidden code detecting means belongs to the G data sequence, with "0 1 0" that the 12-bit word containing the specific 10 bits detected by the forbidden code detecting means belongs to the B data sequence, and with "0 0 1" that the 12-bit word containing the specific 10 bits detected by the forbidden code detecting means belongs to the R data sequence, as shown in FIG. 8.

Incidentally, the identification data indicate with "0 0 0" that the 12-bit word containing the specific 10 bits detected by the forbidden code detecting means does not belong to any of the G, B and R data sequences. This means that the specific 10 bits are not detected by the forbidden code detecting means. Namely, 3 bits of ID0, ID1 and ID2 constituting the identification data are put in "0 0 0" when the specific 10 bits are not detected by the forbidden code detecting means.

Further, when the specific 10 bits are detected by the forbidden code detecting means, the specific 10 bits detected by the forbidden code detecting means are subjected to bit-inversion in which one of 10 bits contained in the specific 10 bits, for example, the third bit counted from the least significant bit, is inverted to produce converted 10 bits which do not correspond to the forbidden code. When a plurality of 10-bit groups each containing the specific 10 bits are detected by the forbidden code detecting means, each of the 10-bit groups is converted into 10 bits (converted 10 bits) which do not correspond to the forbidden code.

FIG. 9 shows a relation between the forbidden code to which the specific 10 bits correspond and the converted 10 bits. In FIG. 9, b0~b9 represent 10 bits from the least significant bit (LSB) b0 to the most significant bit (MSB) b9 constituting the converted 10 bits. The bit positions of the specific 10 bits in the 12-bit word are shown in parentheses.

The converted 10 bits correspond to 10 bits obtained by inverting the third bit (b2) counted from the least significant bit of the specific 10 bits. For example, FIG. 9 shows that the converted 10 bits are "0 0 0 0 0 0 0 1 0 0" when the forbidden code to which the specific 10 bits correspond are 000h. Other cases are similarly shown in FIG. 9. It is apparent that each of eight 10-bit groups of the converted 10 bits does not correspond to the forbidden code.

In addition to the above, when the specific 10 bits are detected by the forbidden code detecting means, the lower 2-bit portions G0;0~G0;1, G1;0~G1;1, G2;0~G2;1, G3;0~G3;1, . . . , B0;0~B0;1, B1;0~B1;1, B2;0~B2;1, B3;0~B3;1, . . . and R0;0~R0;1, R1;0~R1;1, R2;0~R2;1, R3;0~R3;1, . . . are subjected to bit-processing in which the lower 2-bit portions G0;0~G0;1, B0;0~B0;1 and R0;0~R0;1 are bit-multiplexed to produce 6-bit word GBR0(0~1), the lower 2-bit portions G1;0~G1;1, B1;0~B1;1 and R1;0~R1;1 are bit-multiplexed to produce 6-bit word GBR1(0~1), the lower 2-bit portions G2;0~G2;1, B2;0~B2;1 and R2;0~R2;1 are bit-multiplexed to produce 6-bit word GBR2(0~1), the lower 2-bit portions G3;0~G3;1, B3;0~B3;1 and R3;0~R3;1 are bit-multiplexed to produce 6-bit word GBR3(0~1), . . . .

Then, inverted bits G0N;1, G1N;1, G2N;1, G3N;1, . . . , which are to be obtained by inverting each of one of 6 bits contained in the 6-bit word GBR0(0~1), for example, G0;1, one of 6 bits contained in the 6-bit word GBR1(0~1), for example, G1;1, one of 6 bits contained in the 6-bit word GBR2(0~1), for example, G2;1, one of 6 bits contained in the 6-bit word GBR3(0~1), for example, G3;1, . . . , are produced. The inverted bits G0N;1, G1N;1, G2N;1, G3N;1, . . . thus produced are added to the 6-bit words GBR0(0~1), GBR1 (0~1), GBR2(0~1), GBR3(0~1), . . . , respectively, and further 3 bits of ID0, ID1 and ID2 constituting the identification data are added to each of the 6-bit words GBR0(0~1), GBR1(0~1), GBR2(0~1), GBR3(0~1) . . . , so that 10-bit words GBR0 (0~1)+α0, GBR1(01)+α1, GBR2(0~1)+α2, GBR3(0~1)+ α3, . . . are produced, wherein α0 represents 4 bits obtained by adding 3 bits of ID0~ID2 to the inverted bit G0N;1, α1 represents 4 bits obtained by adding 3 bits of ID0~ID2 to the inverted bit G1N;1, α2 represents 4 bits obtained by adding 3 bits of ID0~ID2 to the inverted bit G2N;1, α3 represents 4 bits obtained by adding 3 bits of ID0~ID2 to the inverted bit G3N;1, . . . . Each of the 10-bit words GBR0(0~1)+α0, GBR1(0~1)+α1, GBR2(0~1)+α2, GBR3(0~1)+α3, . . . thus produced does not correspond to the forbidden code because the inverted bits G0N;1, G1N;1, G2N;1, G3N;1, . . . are included in the 10-bit words GBR0(0~1)+α0, GBR1(0~1)+ α1, GBR2(0~1)+α2, GBR3(0~1)+α3, . . . , respectively.

Then, the upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . , any of which has not been subjected to the bit-inversion in which a part of the specific 10 bits is inverted to produce the converted 10 bits or some of which have been subjected to the bit-inversion in which a part of the specific 10 bits is inverted to produce the converted 10 bits, are put in group 1 and group 2 and the 10-bit words GBR0(0~1)+α0, GBR1(0~1)+α1, GBR2(0~1)+α2, GBR3 (0~1)+α3, . . . are added to the group 2, so that 10-bit word group 1 and 10-bit word group 2 which are partitioned with bold lines on a table shown in FIG. 10 are obtained.

20-bit word sequence data DPA(20) having the word rate of 74.25 MB/s are formed based on the 10-bit word group 1 shown in FIG. 10 as a link A, as shown in FIG. 11A. Similarly, 20-bit word sequence data DPB(20) having the word rate of 74.25 MB/s are formed based on the 10-bit word group 2 shown in FIG. 10 as a link B, as shown in FIG. 11B.

Namely, the parallel data DVX in the form of 36-bit word sequence data having the word rate 74.25 MB/s are converted to a couple of 20-bit word sequence data which are the 20-bit word sequence data DPA(20) having the word rate of 74.25 MB/s and the 20-bit word sequence data DPB(20) having the word rate of 74.25 MB/s.

When 10-bit word sequence data which include 4 bits represented with α0, 4 bits represented with α1, 4 bits represented with α2, 4 bits represented with α3, . . . , respectively, in the 20-bit word sequence data DPB(20) is named α-channel as shown in FIG. 11B, each 10-bit word in the α-channel is shown in FIG. 12, for example. In FIG. 12, b0~b9 represent 10 bits from the least significant bit (LSB) b0 to the most significant bit (MSB) b9 constituting each 10-bit word in the α-channel. In each 10-bit word in the α-channel, lower 3 bits b0~b2 are composed of 3 bits of ID0~ID2 constituting the identification data, middle 6 bits b3~b8 are composed of the lower 2-bit portions Rn;0, Rn;1, Bn;0, Bn;1, Gn;0 and Gn;1, and the most significant bit b9 is composed of the inverted bit GnN;1 which corresponds to 1 bit obtained by inverting the ninth bit b8 composed of Gn;1.

The 20-bit word sequence data DPA(20) having the word rate of 74.25 MB/s obtained from the data processing portion 11 are supplied to a data inserting portion 12A and the 20-bit word sequence data DPB(20) having the word rate of 74.25 MB/s obtained from the data processing portion 11 are supplied to a data inserting portion 12B.

In the data inserting portion 12A, ancillary data DAA containing channel identification data as occasion demands are inserted into the 20-bit word sequence data DPA(20) to produce 20-bit word sequence data DPA'(20). The 20-bit word sequence data DPA'(20) obtained from the data inserting portion 12A are supplied to a P/S convertor 13A.

In the P/S convertor 13A, the 20-bit word sequence data DPA'(20) are subjected to P/S conversion to produce serial data DSA having a bit rate of 74.25 MB/s×20=1.485 Gb/s. The serial data DSA are supplied to an electric to optical (E/O) convertor 14A.

In the data inserting portion 12B, ancillary data DAB containing channel identification data as occasion demands are inserted into the 20-bit word sequence data DPB(20) to produce 20-bit word sequence data DPB'(20). The 20-bit word sequence data DPB'(20) obtained from the data inserting portion 12B are supplied to a P/S convertor 13B.

In the P/S convertor 13B, the 20-bit word sequence data DPB'(20) are subjected to P/S conversion to produce serial data DSB having the bit rate of 74.25 MB/s×20=1.485 Gb/s. The serial data DSB are supplied to an E/O convertor 14B.

The E/0 convertor 14A constitutes an optical signal producing portion and is operative to subject the serial data DSA to E/O conversion to produce an optical signal OSA having a central wavelength of, for example, about 1.3 μm and a bit transmission rate of 1.485 Gb/s. The optical signal OSA is guided to a wave multiplexing portion 15. The E/0 convertor 14B also constitutes an optical signal producing portion and is operative to subject the serial data DSB to E/O conversion to produce an optical signal OSB having a central wavelength of, for example, about 1.55 μm and the bit transmission rate of 1.485 Gb/s. The optical signal OSB is also guided to the wave-multiplexing portion 15.

The wave-multiplexing portion 15 is constituted with, for example, a wavelength division multiplexing (WDM) coupler using optical fiber. In the wave-multiplexing portion 15, the optical signal OSA having the central wavelength of about 1.3 μm and the optical signal OSA having the central wavelength of about 1.55 μm are multiplexed with each other to produce a multiplexed optical signal OZV. The multiplexed optical signal OZV is derived from the wave multiplexing portion 15 as a transmission signal. A portion including the E/O convertors 14A and 14B and the wave-multiplexing portion 15 constitutes a data transmitting portion for transmitting the serial data DSA and DSB obtained from the P/S convertors 13A and 13B, respectively.

The multiplexed optical signal OZV which is the transmission signal derived from the wave multiplexing portion 15 is guided through an optical connector 16 to an optical fiber data transmission line 20 to be transmitted thereby to a receiving side. The optical fiber data transmission line 20 is made of, for example, fused quartz single-mode fiber (fused quartz SMF).

In the receiving side, the multiplexed optical signal OZV transmitted through the optical fiber data transmission line 20 is guided through an optical connector 21 to a wave-dividing portion 22. The wave-dividing portion 22 is constituted with, for example, a wavelength division demultiplexing (WDD)

coupler using optical fiber. In the wave-dividing portion 22, the multiplexed optical signal OZV is divided into an optical element having the center wavelength of about 1.3 μm and another optical element having the center wavelength of about 1.55 μm to reproduce the optical signal OSA which has the center wavelength of about 1.3 μm and the bit transmission rate of 1.485 Gb/s and the optical signal OSB which has the center wavelength of about 1.55 μm and the bit transmission rate of 1.485 Gb/s. The optical signals OSA and OSB reproduced by the wave-dividing portion 22 are guided to optical to electric (O/E) convertors 23A and 23B, respectively.

The O/E convertor 23A is operative to subject the optical signal OSA having the center wavelength of about 1.3 μm and the bit transmission rate of 1.485 Gb/s to O/E conversion to reproduce the serial data DSA having bit rate of 1.485 Gb/s. The serial data DSA thus reproduced are supplied to a serial to parallel (S/P) convertor 24A. The O/E convertor 23B is operative to subject the optical signal OSB having the center wavelength of about 1.55 μm and the bit transmission rate of 1.485 Gb/s to O/E conversion to reproduce the serial data DSB having bit rate of 1.485 Gb/s. The serial data DSB thus reproduced are supplied to an S/P convertor 24B.

The S/P convertor 24A is operative to subject the serial data DSA to S/P conversion to reproduce the 20-bit word sequence data DPA'(20) having the word rate of 74.25 MB/s to be supplied to a data separating portion 25A. In the data separating portion 25A, the ancillary data DAA containing the channel identification data are separated from the 20-bit word sequence data DPA'(20) so that the 20-bit word sequence data DPA(20) and the ancillary data DAA are separately obtained. The 20-bit word sequence data DPA(20) are supplied to a data time difference absorbing portion 26.

The S/P convertor 24B is operative to subject the serial data DSB to S/P conversion to reproduce the 20-bit word sequence data DPB'(20) having the word rate of 74.25 MB/s to be supplied to a data separating portion 25B. In the data separating portion 25B, the ancillary data DAB containing the channel identification data are separated from the 20-bit word sequence data DPB'(20) so that the 20-bit word sequence data DPB(20) and the ancillary data DAB are separately obtained. The 20-bit word sequence data DPB(20) are supplied to the data time difference absorbing portion 26.

In the data time difference absorbing portion 26, time difference between the 20-bit word sequence data DPA(20) from the data separating portion 25A and the 20-bit word sequence data DPB(20) from the data separating portion 25B is absorbed to produce 20-bit word sequence data DPAQ(20) which are obtained based on the 20-bit word sequence data DPA(20) to be transmitted at the word transmission rate of 74.25 MB/s and to produce 20-bit word sequence data DPBQ(20) which are obtained based on the 20-bit word sequence data DPB(20) to be transmitted at the word transmission rate of 74.25 MB/s in such a manner that time difference between the 20-bit word sequence data DPAQ(20) and the 20-bit word sequence data DPBQ(20) is substantially zero.

The 20-bit word sequence data DPAQ(20) and the 20-bit word sequence data DPBQ(20) obtained from the data time difference absorbing portion 26 are supplied to a data reproducing portion 30. In the data reproducing portion 30, the identification data constituted with 4 bits of ID0~ID3 or 3 bits of ID0~ID2 and contained in the 20-bit word sequence data DPAQ(20) and DPBQ(20) are detected by identification data detecting means provided in the data reproducing portion 30. Then, the 20-bit word sequence data DPAQ(20) and DPBQ (20) are subjected to data reproduction processing, which is proceeded, with the identification data detected by the identification data detecting means, inversely to the data processing to which the parallel data DVX are subjected in the data processing portion 11 in the transmitting side, to reproduce the parallel data DVX formed based on the 20-bit word sequence data DPAQ(20) and DPBQ(20). The parallel data DVX thus reproduced constitute, for example, the D-Cinema signal of the 4:4:4 type formed with 12-bit word sequences.

Figure 13:
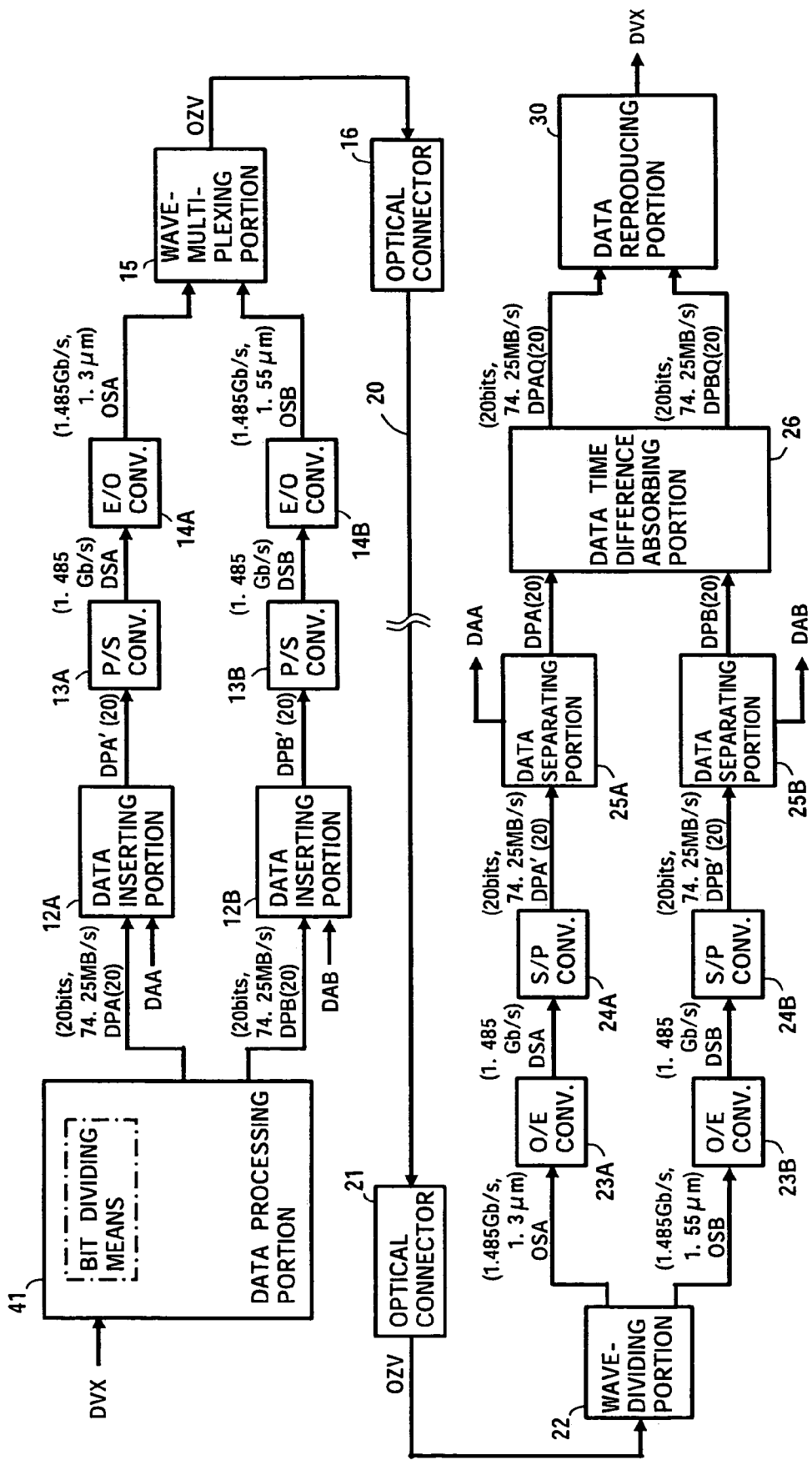
FIG. 13 is a schematic block diagram showing an example of a data transmitting and receiving apparatus including a second embodiment of apparatus for transmitting digital data according to the sixth aspect of the present invention, in which a second embodiment of method of transmitting digital data according to the third aspect of the present invention is carried out.

FIG. 13 shows another example of a data transmitting and receiving apparatus including a second embodiment of apparatus for transmitting digital data according to the sixth aspect of the present invention, in which a second embodiment of method of transmitting digital data according to the third aspect of the present invention is carried out.

The data transmitting and receiving apparatus shown in FIG. 13 has many portions constituted in the similar manner as those in the data transmitting and receiving apparatus shown in FIG. 1. Therefore, in FIG. 13, various circuit blocks, signals and data corr4sponding to those in FIG. 1 are marked with the same references and further description thereof will be omitted.

Referring to FIG. 13, in a transmitting side which constitutes the second embodiment of apparatus for transmitting digital data according to the sixth aspect of the present invention, parallel data DVX constituting a digital video signal are supplied to a data processing portion 41.

The digital video signal constituted with the parallel data DVX is also, for example, a D-Cinema signal of the 4:4:4 type formed with 12-bit word sequences as aforementioned.

The parallel data DVX constituting the D-Cinema signal of the 4;4;4 type formed with 12-bit word sequences are supplied to the data processing portion 41 in the form of 36-bit word sequence data having the data rate (word rate) of 74.25 MB/s, in which a G data sequence of 12-bit word sequence data having a data rate (word rate) of 74.25 MB/s, a B data sequence of 12-bit word sequence data having a data rate (word rate) of 74.25 MB/s and a R data sequence of 12-bit word sequence data having a data rate (word rate) of 74.25 MB/s are multiplexed in parallel with one another in frame and line synchronism, as shown in FIG. 2, in the same manner as the parallel data DVX supplied to the data processing portion 11 in the data transmitting and receiving apparatus shown in FIG. 1.

The data processing portion 41 is operative to subject the parallel data DVX to a selected one of various different data processings.

In an example of the data processing selected for the parallel data DVX in the data processing portion 41, the parallel data DVX are subjected to bit-dividing by bit-dividing means provided in the data processing portion 41 in which each of 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence is divided into an upper 9-bit portion (G0;3~G0;11, G1;3~G1;11, G2;3~G2; 11, G3;3~G3;11, . . . , B0;3~B0;11, B1;3~B1;11, B2;3~B2; 11, B3;3~B3;11, . . . , R0;3~R0;11, R1;3~R1;11, R2;3~R2; 11, R3;3~R3;11, . . . ) and a lower 3-bit portion (G0;0~G0;2, G1;0~G1;2, G2;0~G2;2, G3;0~G3;2, . . . , B0;0~B0;2, B1;0~B1;2, B2;0~B2;2, B3;0~B3;2, . . . , R0;0~R0;2, R1;0~R1;2, R2;0~R2;2, R3;0~R3;2, . . . ).

The upper 9-bit portions G0;3~G0;11, G1;3~G1;11, G2;3~G2;11, G3;3~G3;11, . . . , B0;3~B0;11, B1;3~B1;11, B2;3~B2;11, B3;3~B3;11, . . . and R0;3~R0;11, R1;3~R1;11, R2;3~R2;11, R3;3~R3;11, . . . obtained in the bit-dividing means are subjected to data processing in which inverted bits G0N;11, G1N;11, G2N;11, G3N;11, . . . , B0N;11, B1N;11, B2N;11, B3N;11, . . . and R0N;11, R1N;11, R2N;11, R3N;

11, . . . , which are to be obtained by inverting each of the most significant bits G0;11, G1;11, G2;11, G3;11, . . . , B0;11, B1;11, B2;11, B3;11, . . . and R0;11, R1;11, R2;11, R3; 11, . . . of the upper 9-bit portions G0;3~G0;11, G1;3~G1;11, G2;3~G2;11, G3;3~G3;11, . . . , B0;3~B0;11, B1;3~B1;11, B2;3~B2;11, B3;3~B3;11, . . . and R0;3~R0;11, R1;3~R1;1, R2;3~R2;11, R3;3~R3;11, . . . , are produced, and the inverted bits G0N;11, G1N;11, G2N;11, G3N;11, . . . , B0N;11, B1N; 11, B2N;11, B3N;11, . . . and R0N;11, R1N;11, R2N;11, R3N;11, . . . thus produced are added to the upper 9-bit portions G0;3~G0;11, G1;3~G1;11, G2;3~G2;11, G3;3~G3; 11, . . . , B0;3~B0;11, B1;3~B1;11, B2;3~B2;11, B3;3~B3; 11, . . . and R0;3~R0;11, R1;3~R1;11, R2;3~R2;11, R3;3~R3;11, . . . , respectively, to produce 10 bit words G0;3~G0;11+G0N;11, G1;3~G1;11+G1N;11, G2;3~G2; 11+G2N;11, G3;3~G3;11+G3N;11, . . . , B0;3~B0;11+B0N; 11, B1;3~B1;11+B1N;11, B2;3~B2;11+B2N;11, B3;3~B3; 11+B3N;11, . . . and R0;3~R0;11+R0N;11, R1;3~R1;11+ R1N;11, R2;3~R2;11+R2N;11, R3;3~R3;11+R3N;11, . . . .

Each of the 10-bit words G0;3~G0;11+G0N;11, G1;3~G1; 11+G1N;11, G2;3~G2;11+G2N;11, G3;3~G3;11+G3N; 11, . . . , B0;3~B0;11+B0N;11, B1;3~B1;11+B1N;11, B2;3~B2;11+B2N;11, B3;3~B3;11+B3N;11, . . . and R0;3~R0;11+R0N;11, R1;3~R1;11+R1N;11, R2;3~R2;11+ R2N;11, R3;3~R3;11+R3N;1, . . . thus produced does not correspond to the forbidden code because the inverted bits G0N;11, G1N;11, G2N;11, G3N;11, . . . , B0N;11, B1N;11, B2N;11, B3N;11, . . . and R0N;11, R1N;11, R2N;11, R3N; 11, . . . are included in the 10-bit words G0;3~G0;11+G0N; 11, G1;3~G1;11+G1N;11, G2;3~G2;11+G2N;11, G3;3~G3; 11+G3N;11, . . . , B0;3~B0;11+B0N;11, B1;3~B1;11+B1N; 11, B2;3~B2;11+B2N;11, B3;3~B3;11+B3N;11, . . . and R0;3~R0;11+R0N;11, R1;3~R1;11+R1N;11, R2;3~R2;11+ R2N;11, R3;3~R3;11+R3N;11, . . . , respectively.

The lower 3-bit portions G0;0~G0;2, G1;0~G1;2, G2;0~G2;2, G3;0~G3;2, . . . , B0;0~B0;2, B1;0~B1;2, B2;0~B2;2, B3;0~B3;2, . . . and R0;0~R0;2, R1;0~R1;2, R2;0~R2;2, R3;0~R3;2, . . . are subjected to bit-processing in which the lower 3-bit portions G0;0~G0;2, B0;0~B0;2 and R0;0~R0;2 are bit-multiplexed to produce 9-bit word GBR0 (0~2), the lower 3-bit portions G1;0~G1;2, B1;0~B1;2 and R1;0~R1;2 are bit-multiplexed to produce 9-bit word GBR1 (0~2), the lower 3-bit portions G2;0~G2;2, B2;0~B2;2 and R2;0~R2;2 are bit-multiplexed to produce 9-bit word GBR2 (0~2), the lower 3-bit portions G3;0~G3;2, B3;0~B3;2 and R3;0~R3;2 are bit-multiplexed to produce 9-bit word GBR3 (0~21) . . . .

Inverted bits G0N;2, G1N;2, G2N;2, G3N;2, . . . , which are to be obtained by inverting each of one of 9 bits contained in the 9-bit word GBR0(0~2), for example, G0;2, one of 9 bits contained in the 9-bit word GBR1(0~2), for example, G1;2, one of 9 bits contained in the 9-bit word GBR2(0~2), for example, G2;2, one of 9 bits contained in the 9-bit word GBR3(0~2), for example, G3;2, . . . , are produced, and the inverted bits G0N;2, G1N;2, G2N;2, G3N;2, . . . thus produced are added to the 9-bit words GBR0(0~2), GBR1(0~2), GBR2(0~2), GBR3(0~2), . . . , respectively, to produce 10-bit words GBR0(0~2)+G0N;2, GBR1(0~2)+G1N;2, GBR2 (0~2)+G2N;2, GBR3(0~2)+G3N;2, . . . . Each of the 10-bit words GBR0(0~2)+G0N;2, GBR1(0~2)+G1N;2, GBR2 (0~2)+G2N;2, GBR3(0~2)+G3N;2, . . . thus produced does not correspond to the forbidden code because the inverted bits G0N;2, G1N;2, G2N;2, G3N;2, . . . are included in the 10-bit words GBR0(0~2)+G0N;2, GBR1(0~2)+G1N;2, GBR2 (0~2)+G2N;2, GBR3(0~2)+G3N;2, . . . , respectively.

Then, the 10-bit words G0;3~G0;11+G0N;11, G1;3~G1; 11+G1N;11, G2;3~G2;11+G2N;11, G3;3~G3;11+G3N; 11, . . . , B0;3~B0;11+B0N;11, B1;3~B1;11+B1N;11, B2;3~B2;11+B2N;11, B3;3~B3;11+B3N;11, . . . and R0;3~R0;11+R0N;11, R1;3~R1;11+R1N;11, R2;3~R2;11+ R2N;11, R3;3~R3;11+R3N;11, . . . are put in group 1 and group 2 and the 10-bit words GBR0(0~2)+G0N;2, GBR1 (0~2)+G1N;2, GBR2(0~2)+G2N;2, GBR3(0~2)+G3N;2, . . . are added to the group 2, so that 10-bit word group 1 and 10-bit word group 2 which are partitioned in the same manner as the 10-bit word group 1 and 10-bit word group 2 partitioned with bold lines on the table shown in FIG. 5 are obtained.

20-bit word sequence data DPA(20) having the word rate of 74.25 MB/s are formed based on the 10-bit word group 1 as a link A in the same manner as the 20-bit word sequence data DPA(20) shown in FIG. 6A. Similarly, 20-bit word sequence data DPB(20) having the word rate of 74.25 MB/s are formed based on the 10-bit word group 2 as a link B in the same manner as the 20-bit word sequence data DPB(20) shown in FIG. 6B.

Namely, the parallel data DVX in the form of 36-bit word sequence data having the word rate 74.25 MB/s are converted to a couple of 20-bit word sequence data which are the 20-bit word sequence data DPA(20) having the word rate of 74.25 MB/s and the 20-bit word sequence data DPB(20) having the word rate of 74.25 MB/s.

Each of two 10-bit words contained in each of 20-bits words constituting the 20-bit word sequence data DPA(20), namely, each 10-bit word in the link A is shown in FIG. 14, for example. In FIG. 14, b0~b9 represent 10 bits from the least significant bit (LSB) b0 to the most significant bit (MSB) b9 constituting each 10-bit word in the link A. In each 10-bit word in the link A, lower 9 bits b0~b8 are composed of the upper 9-bit portion Cn;3~Cn;11 and the most significant bit b9 is composed of the inverted bit CnN;11 which corresponds to 1 bit obtained by inverting the ninth bit b8 composed of Cn;11.

When 10-bit word sequence data which include the 10-bit words GBR0(0~2)+G0N;2, GBR1(0~2)+G1N;2, GBR2 (0~2)+G2N;2, GBR3(0~2)+G3N;2, . . . in the 20-bit word sequence data DPB(20) is named α-channel, each 10-bit word in the α-channel is shown in FIG. 15, for example. In FIG. 15, b0~b9 represent 10 bits from the least significant bit (LSB) b0 to the most significant bit (MSB) b9 constituting each 10-bit words in the α-channel. In each 10-bit word in the α-channel, lower 9 bits b0~b8 are composed of the lower 3-bit portion Rn;0~Rn;2, Bn;0~Bn;2 and Gn;0~Gn;2 and the most significant bit b9 is composed of the inverted bit GnN;2 which corresponds to 1 bit obtained by inverting the ninth bit b8 composed of Gn;2.

The 20-bit word sequence data DPA(20) having the word rate of 74.25 MB/s obtained from the data processing portion 41 are supplied to a data inserting portion 12A and the 20-bit word sequence data DPB(20) having the word rate of 74.25 MB/s obtained from the data processing portion 41 are supplied to a data inserting portion 12B.

The part of the data transmitting and receiving apparatus shown in FIG. 13 other than the data processing portion 41, which includes the data inserting portions 12A and 12B, is constituted in the same manner as the part of the data transmitting and receiving apparatus shown in FIG. 1 other than the data processing portion 11 except that, in the data transmitting and receiving apparatus shown in FIG. 13, it is unnecessary for the data reproducing portion 30 in the receiving side to include identification data detecting means and the 20-bit word sequence data DPAQ(20) and DPBQ(20) are subjected to data reproduction processing, which is proceeded, without any identification data, inversely to the data processing to which the parallel data DVX are subjected in the data processing portion 41 in the transmitting side, to reproduce the parallel data DVX formed based on the 20-bit word sequence data DPAQ(20) and DPBQ(20) in the data reproducing portion 30. The parallel data DVX thus reproduced by the data reproducing portion 30 in the data transmitting and receiving apparatus shown in FIG. 13 also constitute, for example, the D-Cinema signal of the 4:4:4 type formed with 12-bit word sequences.

What is claimed is:

1. A method of transmitting digital data, which comprises the steps of;

forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, obtaining identification data representing one of the first, second and third data sequences, to which one of the 12-bit words containing specific 10 bits corresponding to a predetermined forbidden code belongs, when one of divided upper 10-bit portions contains the specific 10 bits, replacing the specific 10 bits with additional 10 bits which do not correspond to the predetermined forbidden code when the identification data are obtained, replacing also 2 bits contained in one of divided lower 2-bit portions obtained from the 12-bit word which had contained the specific 10 bits with predetermined 2 bits which are prepared for replacing when the identification data are obtained, arranging in sequence 10-bit words each constituted with the divided upper 10-bit portion and at least one 10-bit word constituted with the additional 10 bits to produce the first word sequence data when the identification data are obtained, and arranging in sequence 10-bit words each constituted with 10 bits which include the divided lower 2-bit portions and the identification data and at least one 10-bit word constituted with 10 bits which include at least one group of the predetermined 2 bits and the identification data to produce the second word sequence data when the identification data are obtained;

converting the first word sequence date into first serial data and the second word sequence data to second serial data; and transmitting the first and second serial data.

2. A method of transmitting digital data according to claim 1, wherein said additional 10 bits used for replacing the specific 10 bits are produced based on a lower 10-bit portion of the 12-bit word which had contained the specific 10 bits by means of inverting at least one of 10 bits contained in said lower 10-bit portion.

3. A method of transmitting digital data according to claim 2, wherein the fifth bit counted upward from the least significant bit in said 10 bits contained in the lower 10-bit portion is inverted.

4. A method of transmitting digital data according to claim 1, wherein said second word sequence data comprises a sequence of words including 10-bit words each constituted with 10 bits which include three lower 2-bit portions divided respectively from three 12-bit words belonging respectively to the first, second and third data sequences and the identification data and at least one 10-bit word constituted with 10 bits which include said three lower 2-bit portions, at least one of which is replaced with the predetermined 2 bits, and the identification data.

5. A method of transmitting digital data according to claim 4, wherein said identification data are constituted with 4 bits.

6. A method of transmitting digital data according to claim 5, wherein said predetermined 2 bits are selected to be one of "0 1" and "1 0".

7. A method of transmitting digital data, which comprises the steps of;

forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, obtaining identification data representing one of the first, second and third data sequences, to which one of the 12-bit words containing specific 10 bits corresponding to a predetermined forbidden code belongs, when one of divided upper 10-bit portions contains the specific 10 bits, converting the specific 10 bits into additional 10 bits which do not correspond to the predetermined forbidden code by means of inverting at least one bit contained in the specific 10 bits when the identification data are obtained, arranging in sequence 10-bit words each constituted with the divided upper 10-bit portion and at least one 10-bit word constituted with the additional 10 bits to produce the first word sequence data when the identification data are obtained, and arranging in sequence 10-bit words each constituted with 10 bits which include divided lower 2-bit portions, an inverted bit obtained by means of inverting one of 2 bits contained in one of the divided lower 2-bit portions and the identification data to produce the second word sequence data when the identification data are obtained;

converting the first word sequence date into first serial data and the second word sequence data to second serial data; and transmitting the first and second serial data.

8. A method of transmitting digital data according to claim 7, wherein said additional 10 bits are produced by means of inverting the third bit counted upward from the least significant bit in the specific 10 bits.

9. A method of transmitting digital data according to claim 7, wherein said second word sequence data comprises a sequence of 10-bit words each constituted with 10 bits which include three lower 2-bit portions divided respectively from three 12-bit words belonging respectively to the first, second and third data sequences, a bit obtained by means of inverting one of 2 bits contained in one of said three lower 2-bit portions and the identification data.

10. A method of transmitting digital data according to claim 9, wherein said identification data are constituted with 3 bits.

11. A method of transmitting digital data, which comprises the steps of;

forming first word sequence data and second word sequence data by means of subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 9-bit portion and a lower 3-bit portion, producing 10-bit words each constituted with one of divided upper 9-bit portions and a first inverted bit obtained by means of inverting one of 9 bits contained in said one of divided upper 9-bit portions, arranging in sequence the 10-bit words to produce the first word sequence data, and arranging in sequence additional 10-bit words each constituted with 10 bits which include divided lower 3-bit portions and a second inverted bit obtained by means of inverting one of 3 bits contained in the divided lower 3-bit portion to produce the second word sequence data;

converting the first word sequence date into first serial data and the second word sequence data to second serial data; and transmitting the first and second serial data.

12. A method of transmitting digital data according to claim 11, wherein said first inverted bit is obtained be means of inverting the most significant bit of 9 bits contained in said one of divided upper 9-bit portions.

13. An apparatus for transmitting digital data, which comprises;

data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, forbidden code detecting means for detecting specific 10 bits corresponding to a predetermined forbidden code contained in one of divided upper 10-bit portions, and identification data producing means for obtaining identification data representing one of the first, second and third data sequences, to which one of the 12-bit words containing the specific 10 bits detected by the forbidden code detecting means belongs, wherein the specific 10 bits are replaced with additional 10 bits which do not correspond to the predetermined forbidden code and 2 bits contained in one of divided lower 2-bit portions obtained from the 12-bit word which had contained the specific 10 bits are also replaced with predetermined 2 bits which are prepared for replacing when the specific 10 bits are detected by the forbidden code detecting means, 10-bit words each constituted with the divided upper 10-bit portion and at least one 10-bit word constituted with the additional 10 bits are arranged in sequence to produce first word sequence data when the specific 10 bits are detected by the forbidden code detecting means, and 10-bit words each constituted with 10 bits which include the divided lower 2-bit portions and the identification data and at least one 10-bit word constituted with 10 bits which include at least one group of the predetermined 2 bits and the identification data are arranged in sequence to produce second word sequence data when the specific 10 bits are detected by the forbidden code detecting means;

parallel to serial converting means for converting the first word sequence date obtained from the data processing means into first serial data and the second word sequence data obtained from the data processing means into second serial data; and data transmitting means for transmitting the first and second serial data obtained from the parallel to serial converting means.

14. An apparatus for transmitting digital data according to claim 13, wherein said additional 10 bits used for replacing the specific 10 bits in the data processing means are produced based on a lower 10-bit portion of the 12-bit word which had contained the specific 10 bits by means of inverting at least one of 10 bits contained in lower 10-bit portion of the 12-bit word which had contained the specific 10 bits.

15. An apparatus for transmitting digital data, which comprises;

data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 10-bit portion and a lower 2-bit portion, forbidden code detecting means for detecting specific 10 bits corresponding to a predetermined forbidden code contained in one of divided upper 10-bit portions, and identification data producing means for obtaining identification data representing one of the first, second and third data sequences, to which one of the 12-bit words containing the specific 10 bits detected by the forbidden code detecting means belongs, wherein the specific 10 bits are converted into additional 10 bits which do not correspond to the predetermined forbidden code by means of inverting at least one bit contained in the specific 10 bits when the specific 10 bits are detected by the forbidden code detecting means, 10-bit words each constituted with the divided upper 10-bit portion and at least one 10-bit word constituted with the additional 10 bits are arranged in sequence to produce first word sequence data when the specific 10 bits are detected by the forbidden code detecting means, and 10-bit words each constituted with 10 bits which include divided lower 2-bit portions, an inverted bit obtained by means of inverting one of 2 bits contained in one of the divided lower 2-bit portions and the identification data are arranged in sequence to produce second word sequence data when the specific 10 bits are detected by the forbidden code detecting means;

parallel to serial converting means for converting the first word sequence date obtained from the data processing means into first serial data and the second word sequence data obtained from the data processing means into second serial data; and data transmitting means for transmitting the first and second serial data obtained from the parallel to serial converting means.

16. An apparatus for transmitting digital data, which comprises;

data processing means including bit-dividing means for subjecting parallel data, which are constituted with first, second and third data sequences each constituting 12-bit word sequence and multiplexed in parallel with one another to form a digital video signal, to bit-dividing in which each 12-bit word contained in each of the 12-word sequences is divided into an upper 9-bit portion and a lower 3-bit portion, wherein 10-bit words each constituted with one of divided upper 9-bit portions and a first inverted bit obtained by means of inverting one of 9 bits contained in the divided upper 9-bit portion are produced, the 10-bit words thus produced are arranged in sequence to produce first word sequence data, and additional 10-bit words each constituted with 10 bits which include divided lower 3-bit portions and a second inverted bit obtained by means of inverting one of 3 bits contained in the divided lower 3-bit portion are arranged in sequence to produce second word sequence data;

parallel to serial converting means for converting the first word sequence date obtained from the data processing means into first serial data and the second word sequence data obtained from the data processing means into second serial data; and data transmitting means for transmitting the first and second serial data obtained from the parallel to serial converting means.

* * * * *